United States Patent [19]

Shepard

[11] Patent Number: 4,953,203

[45] Date of Patent: Aug. 28, 1990

[54] HIGH CAPACITY INFORMATION FORWARDING SYSTEM

[75] Inventor: James B. Shepard, Pickerington, Ohio

[73] Assignee: AT&T Bell Laboratories, Murray Hill, N.J.

[21] Appl. No.: 385,127

[22] Filed: Jul. 26, 1989

[51] Int. Cl.⁵ .......................................... H04M 3/42
[52] U.S. Cl. ................................... 379/207; 379/201; 379/219
[58] Field of Search ............... 379/112, 113, 233, 222, 379/224, 219, 207, 201, 229, 230, 284, 280

[56] References Cited

U.S. PATENT DOCUMENTS

| | | | |
|---|---|---|---|
| 4,162,377 | 7/1979 | Mearns | 379/127 |
| 4,191,860 | 3/1980 | Weber | 379/115 |
| 4,348,554 | 9/1982 | Asmuth | 379/113 |
| 4,611,094 | 9/1986 | Asmuth et al. | 379/113 X |
| 4,723,270 | 2/1988 | Okamoto et al. | 379/113 |
| 4,827,500 | 5/1989 | Binkard et al. | 379/220 X |

Primary Examiner—James L. Dwyer
Attorney, Agent, or Firm—Dwight A. Marshall

[57] ABSTRACT

A high capacity information forwarding system for use with originating screening offices of a telephone network. Apparatus periodically accesses a centralized data base within the telephone network and translates a predefined telephone number dialed by a calling telephone station into a destination telephone number of a called telephone station. The apparatus, upon determining the information forwarding service capability of the called telephone station, stores the predefined and translated destination telephone numbers at the originating screening office. Upon subsequent receipt of the dialed predefined telephone number, the originating screening office accesses the information stored therein and establishes a telephone connection between a calling telephone station and a called telephone station identified by the stored destination telephone number and forwards information of the calling telephone station thereto.

16 Claims, 3 Drawing Sheets

HIGH CAPACITY INFORMATION FORWARDING SYSTEM

TECHNICAL FIELD

The invention relates to a high capacity information forwarding system and in particular to apparatus and a method for increasing the call handling capability of a telephone network information forwarding system.

BACKGROUND AND PROBLEM

The public telephone network provides an enhanced service to telephone customers wherein telephone customers subscribing to the service may receive information identifying the telephone number of a telephone station calling the telephone customer. The enhanced service, called Automatic Number Identification Delivery Service, forwards the telephone number of the calling telephone station over the public telephone network to the called telephone customer. In operation, a user of a calling telephone station dials a predetermined telephone number, such as an 800 telephone number, assigned to a telephone customer having subscribed to 800 enhanced telephone service. A local exchange carrier telephone company serving the calling telephone station transmits the dialed 800 telephone number and the telephone number assigned the calling telephone station to an originating screening office of the public telephone network.

On each incoming 800 call, the originating screening office temporarily stores the calling telephone number and formulates a query data message identifying the dialed 800 and calling telephone area code numbers that is transmitted over a data link to a telephone network centralized data base, such as a network control point. The network centralized data base translates the received 800 telephone number into a North American Numbering Plan destination telephone number which is transmitted as a reply data message over a data link back to the network originating screening office. Upon receipt of the reply data message, the originating screening office establishes a call connection between the calling telephone station and the called telephone station in accordance with the destination telephone number over the telephone network and transmits the stored calling telephone number to the called customer.

A problem arises with the current system in that for each dialed 800 telephone call incoming to the originating screening office a query data message must be formulated and transmitted to the network centralized data base. In addition, a reply data message must be generated by the network centralized data base and returned to the originating screening office before the connection can be established with the called telephone customer. The time spent in formulating the data messages and transmitting them between the originating screening office and the network centralized data base greatly increases the setup time required to establish the call connection. The increase of the call connection time creates another problem in that it reduces the number of incoming 800 telephone calls that can be handled by the network originating screening offices.

SOLUTION

The foregoing problems are solved by telephone network originating screening offices arranged to periodically access a network centralized data base and translate a predefined telephone number dialed by a call originating telephone station into a destination telephone number assigned a called telephone station and upon determining an information forwarding capability of the called telephone station for storing the predefined and translated destination telephone numbers at originating screening offices of the telephone network. An originating screening office is enabled by the subsequent receipt of the predefined telephone number dialed by a calling telephone station to access the stored predefined and translated telephone numbers and establish a telephone connection between the calling telephone station and the called telephone station identified by the stored destination telephone number and forward information associated with the calling telephone station to the called telephone station.

The apparatus and method of operation of the instant high capacity information system has storage devices located at originating screening offices of a telephone network for storing both a predefined telephone number and a translated destination telephone number associated with the predefined telephone number and identifying a calling telephone station. The originating screening office receiving a predefined telephone number dialed from a calling telephone station searches the storage devices and upon failure to locate the dialed predefined telephone number in the storage devices formulates a query data message including the predefined telephone number and transmits the query data message to a telephone network centralized data base. The telephone network centralized data base responds to receipt of the query data message by translating the received predefined telephone number into a destination telephone number identifying the called telephone station and determines the information forwarding service capability of the called telephone station.

A reply data message including the predefined and translated destination telephone numbers and the information forwarding service capability of the called telephone station is formulated by the telephone network centralized data base and transmitted to the originating screening office having received the dialed predefined telephone number. Upon receipt of the reply data message identifying the information forwarding service capability of the called telephone station, the originating screening office stores the predefined and translated destination telephone numbers in the originating screening office storage devices. The originating screening office subsequently receiving a dialed predefined telephone number searches the storage devices and upon locating the stored predefined telephone number establishes a connection with the stored predefined telephone number and forwards calling telephone station information thereto. Timing apparatus periodically flushes the predefined and translated destination telephone numbers from the storage devices of each originating screening office.

DETAILED DESCRIPTION

Figure 1:
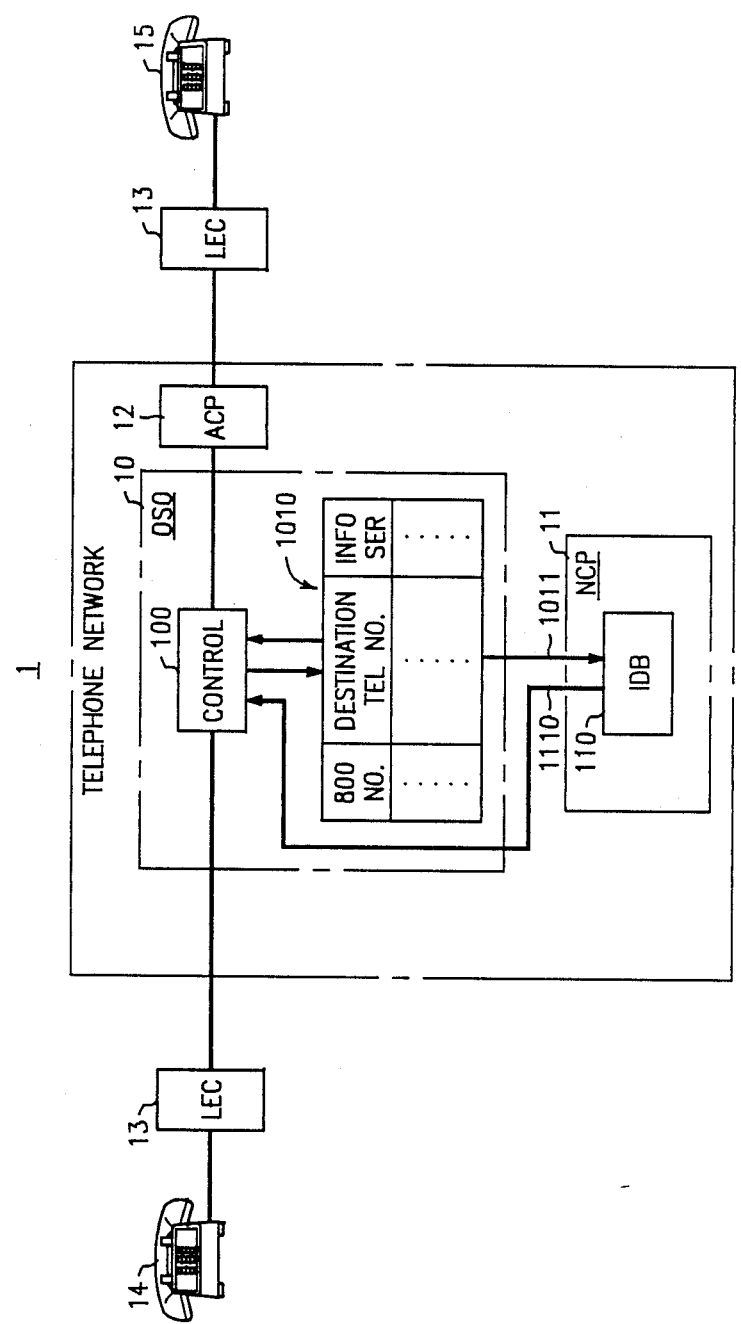
FIG. 1 is a diagram of a telephone network having high capacity information forwarding apparatus embodying the principles of the invention.

In an exemplary embodiment of the invention, telephone network 1, FIG. 1, may be a telephone network, such as the well-known AT&T public telephone network, used to provide long distance telephone and data services for customers, such as customers having telephone stations 14 and 15. Telephone network 1 also provides enhanced services, such as Automatic Number Identification Delivery Service, to called customers having 800 service. A called customer having Automatic Number Identification Delivery Service is assigned a predefined number, such as an 800 telephone number and telephone network 1, is arranged so that a calling telephone station 14 having dialed the predefined telephone number assigned the called customer is connected via telephone network 1 with telephone station 15. Since the called customer is assumed to have Automatic Number Identification Delivery Service, telephone network 1 also forwards information associated with calling telephone 14, such as the telephone number assigned thereto, to called telephone station 15.

Telephone network 1 has a plurality of originating screening offices 10 each connected with serving areas of local exchange carriers 13, such as the Bell Telephone Companies. Each local exchange carrier is well-known and need not be described in detail for an understanding of the instant invention but sufficient to say is arranged to interconnect calling telephone station 14 having dialed the predefined telephone number assigned to called telephone station 15 with originating screening office 10 and to complete a connection from telephone network 1 to called telephone station 15. Originating screening offices 10 may be any of a number of well-known types of telephone switching equipment, such as AT&T 4 ESS TM and 5 ESS ® electronic equipment switching systems, arranged to interconnect trunks incoming from local exchange carriers 13 with telephone network trunks coupled with other telephone network electronic switching systems, such as action control point 12.

Each telephone network electronic switching system, such as originating screening office 10, is interconnected by data links of the well-known common channel signaling network that is arranged to exchange data messages between electronic switching systems of telephone network 1 and which is used to control the telephone network electronic switching systems to interconnect calling telephone station 14 with called telephone station 15. Telephone network 1 is also assumed to have a number of centralized data bases 11, sometimes called network control points, positioned at various locations within telephone network 1 and interconnected with telephone network electronic switching systems by the data links of the common channel signaling network so as to provide various features of enhanced service, such as 800 telephone number service.

Figure 2:
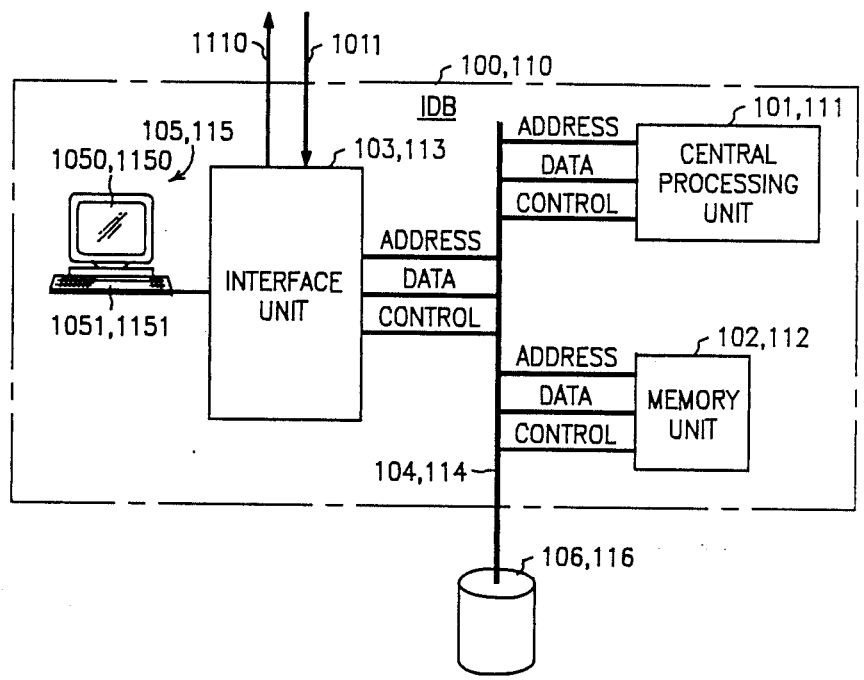
FIG. 2 illustrates the functional apparatus relationship of originating screening offices and telephone network centralized data base apparatus set forth in FIG. 1.

Originating screening office 10 and network centralized data base, FIG. 2, each have a processor 100, 110, respectively, that may be a computer, such as an AT&T 1B or 3B20 simplex or duplex computer. Such computers need not be described in detail for an understanding of the invention and in general have a central processing unit 101, 111, memory unit 102, 112, and an interface unit 103, 113 each connected by address, data and control leads to a central bus 104, 114. Interface unit 103, 113 couples data links 1110 and 1011 interconnecting originating screening office 10 and network centralized data base 11 with bus 104, 114 so that data may be exchanged by originating screening office 10 and centralized data base 11 with memory units 101, 111. Computer terminals 105, 115, which may be any of a number of well-known computer terminals sometimes referred to as personal computers, are coupled to interface units 103, 113 so that data may be entered into central processing units 101, 111 by input devices 1051, 1151 and read therefrom by use of output devices 1050, 1150, respectively. In addition, each processor 100, 110 has storage devices 106, 116 coupled by address, data and control leads with bus 104, 114 such that data may be read into, stored therein and read from by central processing units 101, 111.

In the instant embodiment of the invention, it is assumed that a called customer located at telephone station 15, FIG. 1, has subscribed to 800 service wherein calling telephone station having dialed a predefined telephone number, such as an 800 number identifying the called customer, is connected to called telephone station 15 identified by a destination telephone number. It is further assumed that the called customer has subscribed to enhanced service Automatic Number Identification Delivery Service wherein information, such as the telephone number of any calling telephone station, is forwarded over telephone network 1 to called telephone station 15.

Having subscribed to Automatic Number Identification Delivery Service, the 800 predefined number identifying the called customer, the destination telephone number of called telephone station 15 and information that called telephone station 15 has information forwarding service capability are stored in storage device 116, FIG. 2, of network centralized data base 11. Centralized data base processor 110 is programmed upon receipt of a dialed predefined telephone number to translate the predefined telephone number into the destination telephone number of telephone station 15.

Originating screening office 10, FIG. 1, has a storage table 1010 initially empty in processor storage device 106, FIG. 2, for storing both the predefined telephone number identifying the called customer and the translated destination telephone number of called customer telephone station 15. Calling telephone station 14, FIG. 1, used to originate a predefined telephone number call to telephone station 15, dials the predefined telephone number and is connected by local exchange carrier 13 to originating screening office 10 of telephone network 1. Originating screening office processor 100, upon receipt of the dialed predefined telephone number, searches storage table 1010 and when failing to find the dialed predefined telephone number stored therein, formulates a query data message, including the dialed predefined telephone number, and transmits the query data message over data link 1110 of the common channel signaling network to network centralized data base 11.

Network centralized data base 11 receives the incoming query data message and translates the predefined telephone number set forth therein into the destination telephone number of telephone station 15. Central processing unit 111 of network centralized data base 11 determines the information forwarding service capability available to the called customer and formulates a reply data message in response to the received query data message. The reply data message, including the dialed predefined telephone number, the translated destination telephone number and the indication that information forwarding service is available to the called customer, is transmitted over data link 1110, FIG. 1, of the common channel network to originating screening office 10.

Originating screening office 10, upon receipt of the reply data message, is enabled by the indication of information forwarding service to store both the received predefined telephone number identifying the called customer and the translated destination telephone number of telephone station 15 associated with the predefined telephone number along with information that information forwarding service is provided the called customer in storage device 106, FIG. 2, by central processing unit 101.

After storing the received information in table 1010 of storage device 106, originating screening office 10, FIG. 1, utilizes the translated destination telephone number to establish a connection via telephone network 1 and local exchange carrier 13 with called telephone station 15. Information associated with calling telephone station 14, such as the telephone number assigned thereto, is forwarded to called telephone station 15 in accordance with the provisions of Automatic Number Identification Delivery Service.

Upon receipt of the predefined telephone number subsequently dialed by calling telephone stations, such as calling telephone station 14, originating screening office central processing unit 101, FIG. 2, searches table 1010 stored in storage device 106 for the dialed predefined telephone number. When the dialed predefined telephone number is located within storage device 106, central processing unit 101 controls originating screening office 10, FIG. 1, to establish a connection via telephone network 1 between calling telephone station 14 and called telephone station 15 identified by the stored translated destination telephone number associated with the stored predefined telephone station number and forwards information associated with calling telephone station 14 to called telephone station 15.

The call handling capability of the Automatic Number Identification Delivery Service of telephone network 1 is greatly increased by periodically accessing telephone network centralized data base 11 on a first telephone call having dialed the predefined telephone and storing both the predefined and translated destination telephone numbers at originating screen offices 10 wherein the stored numbers identify a called telephone station 15 of a customer having Automatic Number Identification Delivery Service. Subsequent calls incoming to originating screen offices from calling telephones 14 having dialed the predefined telephone number assigned the called customer are connected with called customer telephone station 15 in accordance with the previously translated destination telephone number stored in originating screening office 10. Thus, subsequent calls do not require additional time necessary to access telephone network centralized data base 11 for the purpose of translating the dialed predefined telephone number into the destination telephone and transmitting the predefined and translated destination telephone numbers to the originating screening office for each call.

Figure 3:
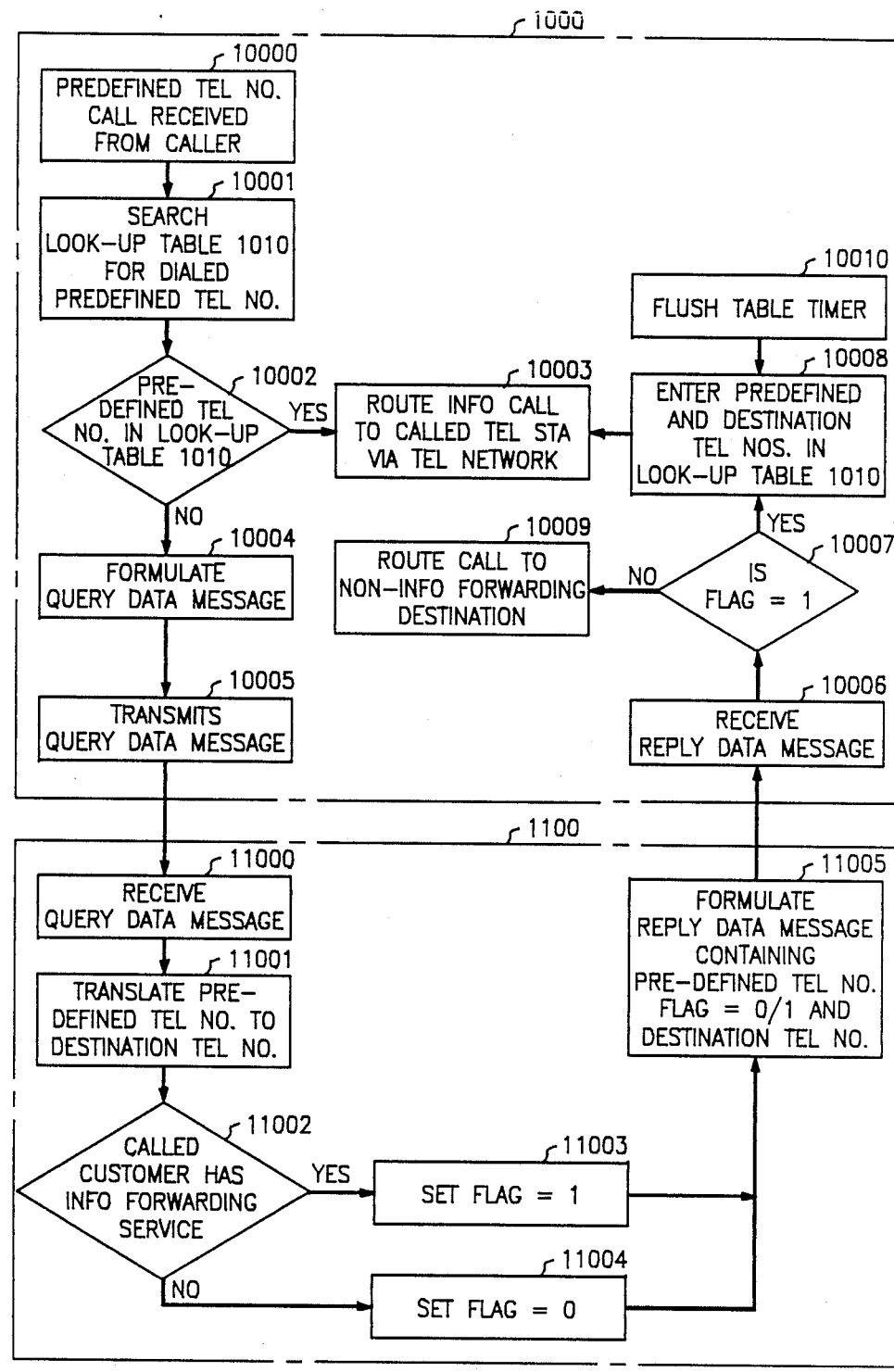
FIG. 3 illustrates a flow chart of the operation of the high capacity information forwarding apparatus set forth in FIGS. 1 and 2 embodying the principles of the invention.

In the method of operation, FIG. 3, steps 1000, 1100, calling telephone station 14 originates a call by dialing a predefined telephone number identifying a called customer having Automatic Number Identification Delivery Service. Local exchange carrier 13, FIG. 1, routes the call in a well-known manner to originating screening office 10 of telephone network 1. Upon receiving the dialed predefined telephone number, FIG. 3, step 10000, central processing unit 101, FIG. 2, of originating screening office 10 conducts a search of table 1010 located in storage device 106, step 10001, FIG. 3. Assuming that the call is an initial call, the dialed predefined telephone number is not present in the storage table 1010, step 10002. Originating screening office 10 then formulates a query data message, step 10004, including the dialed predefined telephone number, and transmits the formulated query data message, step 10005, over a data link 1011 of the common channel signaling network, FIG. 1, to telephone network centralized data base 11.

Telephone network centralized data base 11, FIG. 3, upon receiving the query data message, step 11000, searches storage device 116, FIG. 2, for customer records recorded therein that identify predefined telephone numbers assigned to customers and the type of enhanced services, such as Automatic Number Identification Delivery Service, that are available for the use of each customer. If the calling telephone station dialed predefined telephone number is found in a customer record, the predefined telephone number is translated into a destination telephone number assigned to called telephone station 15, step 11001. If the dialed predefined telephone number is not found, centralized data base 11 transmits a reply data message to originating screening office 10 directing return of an announcement to calling telephone station 14 that the predefined number is currently unassigned.

Central processing unit 111 of telephone network centralized data base 11 sets an indicator flag, step 11003, to a binary state one when the called customer has Automatic Number Identification Delivery Service and if not, sets the flag to a binary state zero, step 11004. After translation, a reply data message is formulated including the dialed predefined and translated destination telephone numbers with the determined information forwarding service capability of the called telephone station, step 11005, and transmitted from telephone network centralized data base 11, FIG. 1, over data link 1110 of the common channel signaling network to originating screening office 10.

Upon receiving the transmitted reply data message, FIG. 3, step 10006, central processing unit 101 determine the state of the flag indication, step 10007. If the indicator flag has been set to zero indicating that the called telephone station does not have information forwarding capability, the incoming telephone call is routed to a called telephone station 15 not having Automatic Number Identification Delivery Service, step 10009, by establishing a connection via telephone network 1 between calling telephone station 14, FIG. 1, and the called telephone station identified by the translated destination telephone number included in the received reply data message.

Should the indicator flag be set to a binary one indication, processing unit 101, FIG. 2, enters the predefined and translated telephone numbers into table 1010 located in storage device 106, FIG. 3, step 10008. The incoming call, step 10003, is then routed to called telephone station 15 by establishing a connection between calling telephone station 14, FIG. 1, and called telephone station 15 and forwarding calling telephone station 14 information thereto via telephone network 1.

After the predefined and translated telephone numbers have been stored in table 1010 of storage device 106 originating screening office 10 responds to subsequent receipt of incoming calls from calling telephone stations, such as telephone station 14, having dialed the predefined telephone number, FIG. 3, step 10000, by searching table 1010 for the dialed predefined telephone number, step 10001. Upon finding the dialed predefined telephone number stored in table 1010 of storage device 106, originating screening office 10, FIG. 1, establishes connections via telephone network 1 between calling telephone stations 14 and called telephone station 15 and forwards calling telephone station information to called telephone station 15. Periodically, timing apparatus, FIG. 3, step 10010, flushes table 1010, FIG. 1, to remove ones of the predefined and translated telephone numbers stored therein beyond a predetermined interval of time.

Thus, in the operation of the instant high capacity information forwarding system, originating screening offices 10 of telephone network 1 receiving predefined telephone numbers dialed by calling telephone stations 14 periodically access a telephone network centralized data base 11 to translate the predefined telephone numbers into destination telephone numbers assigned called telephone stations. When it is determined, the called telephone station customer has an enhanced service, such as Automatic Number Identification Delivery Service, originating screening office 10 stores the predefined and translated telephone numbers in a store device thereof and establishes a call connection via telephone network 1 between calling and called telephone stations 14, 15 and forwards information of calling telephone station 14 to called telephone station 15. Upon subsequent calls intended for a called customer having information forwarding service and wherein calling telephone stations have dialed the previously-stored predefined telephone number, originating screening office 10 searches table 1010 of storage device 106. When locating a stored predefined telephone number matching the dialed predefined number, originating screening office 10 establishes a connection between the calling and called telephone stations 14, 15 via telephone network 1 and forwards information relating to called telephone station 14 to called telephone station 15 without the necessity of accessing telephone network centralized data base 11. Thus, the time of completing call connections is substantially reduced thereby increasing the call handling capability and efficiency of telephone network information forwarding systems.

I claim:

1. A high capacity information forwarding system for use in a telephone network comprising
    means for periodically accessing a centralized data base of the telephone network and translating a predefined telephone number dialed by a call originating telephone station into a destination telephone number of a called telephone station and upon determining an information forwarding service capability of said called telephone station for storing said predefined and translated destination telephone numbers at originating screening offices of the telephone network, and
    means enabled upon subsequent receipt of said dialed predefined telephone number at said originating screening offices for accessing said predefined and translated telephone numbers and establishing a telephone connection between said calling telephone station and said called telephone station identified by said stored destination telephone number and forwarding information associated with said calling telephone to said called telephone station.

2. The high capacity information forwarding system set forth in claim 1 wherein said accessing and storing means comprises
    storage means located at said originating screening offices of the telephone switching network for storing both said predefined telephone number and said translated destination telephone number associated with said predefined telephone number.

3. The high capacity information forwarding system set forth in claim 2 wherein said accessing and storing means comprises
    means located at said originating screening offices and enabled upon an originating screening office receiving said dialed predefined telephone number from a calling telephone station for formulating a query data message including said predefined telephone number and transmitting said query data message to said telephone network centralized data base.

4. The high capacity information forwarding system set forth in claim 3 wherein said accessing and storing means comprises
    means located at said telephone network centralized data base and responsive to receipt of said query data message for translating said predefined telephone number into said destination telephone number, and
    means for determining said information forwarding service capability of said called telephone station identified by said translated destination telephone number.

5. The high capacity information forwarding system set forth in claim 4 wherein said accessing and storing means comprises
    means located at said telephone network centralized data base for formulating a reply data message including said predefined and translated destination telephone numbers with said determined information forwarding service capability of said called telephone station and transmitting said reply data message to said originating screening office having received said dialed predefined telephone number.

6. The high capacity information forwarding system set forth in claim 5 wherein said accessing and storing means comprises
    means located at said originating screening offices and enabled upon receipt of said reply data message identifying said information forwarding service capability for storing said predefined telephone number and said translated destination telephone numbers in said storage means.

7. The high capacity information forwarding system set forth in claim 6 wherein said accessing and forwarding means comprises
    means enabled upon each subsequent receipt of said telephone dialed predefined telephone number at said originating screening office for searching said storage means and upon locating said stored predefined telephone number for establishing a connection with said called telephone station and forwarding said calling telephone station information thereto.

8. The high capacity information forwarding system set forth in claim 7 wherein said originating screening offices comprises timing means for periodically removing said predefined telephone number and said translated destination telephone number from said storage means.

9. A high capacity information forwarding system for use in a telephone network wherein said system comprises storage means located at originating screening offices of the telephone network for storing both a predefined telephone number and translated destination telephone number associated therewith, means enabled upon an originating screening office receiving said dialed predefined telephone number from a calling telephone station for searching said storage means and upon failure to locate said predefined telephone number in said storage means for accessing a centralized data base of the telephone network and translating said dialed predefined telephone into a destination telephone number identifying a called telephone station and upon determining an information forwarding service capability of said called telephone station for storing said predefined and translated destination telephone numbers in said storage means, and means enabled by storage of said predefined and translated destination telephone numbers and upon subsequent locating said predefined and translated destination telephone numbers in said storage means upon receipt of said dialed predefined telephone number at said originating screening offices for establishing a telephone connection between said calling telephone station and said called telephone station identified by said stored destination telephone number and forwarding information associated with said calling telephone station to said called telephone station.

10. A high capacity information forwarding system for use in a telephone network wherein said system comprises storage means located at originating screening offices of the telephone switching network for storing both a predefined telephone number and a translated destination telephone number associated with said predefined telephone number, means located at said originating screening offices and enabled upon an originating screening office receiving said predefined telephone number dialed from a calling telephone station for searching said storage means and upon failure to locate said dialed predefined telephone number in said storage means formulating a query data message including said predefined telephone number and transmitting said query data message to a telephone network centralized data base, means located at said telephone network centralized data base and responsive to receipt of said query data message for translating said predefined telephone number into said destination telephone number identifying a called telephone station, means for determining an information forwarding service capability of said called telephone station, means located at said telephone network centralized data base for formulating a reply data message including said predefined and translated destination telephone numbers with said determined information forwarding service capability of said called telephone station and transmitting said reply data message to said originating screening office having received said dialed predefined telephone number, means located at said originating screening offices and enabled upon receipt of said reply data message identifying said information forwarding service capability for storing said predefined and said translated destination telephone numbers in said storage means, means enabled upon each subsequent receipt of said telephone dialed predefined telephone number at said originating screening office for searching said storage means and upon locating said stored predefined telephone number for establishing a connection with said called telephone station and forwarding said calling telephone station information thereto, and timing means for periodically removing said predefined and said translated destination telephone numbers from said storage means of each originating screening office.

11. A high capacity information forwarding system for use with an originating screening office of the telephone network wherein said system comprises means for periodically accessing a centralized telephone network data base and translating a predefined telephone number dialed by a calling telephone station into a destination telephone number and upon determining an information forwarding service capability of a called telephone station identified by said destination telephone number for storing said predefined and translated destination telephone numbers in a storage device of the originating screening office, and means enabled upon subsequent receipt of said dialed predefined telephone number for accessing said originating screening office storage device and establishing a telephone connection between said calling telephone station and said called telephone station identified by said stored destination telephone number and forwarding information of said calling telephone station thereto.

12. A method of operating a high capacity information forwarding system in an originating screening office of a telephone network wherein said method comprises the steps of periodically accessing a telephone network centralized data base upon receipt of a predefined telephone number dialed by a calling telephone station and translating said dialed predefined telephone number into a destination telephone number of a called telephone station, storing said predefined telephone number and said translated destination telephone number in storage at said originating screening office upon determining said called telephone station has calling telephone station information forwarding service capability, and accessing said stored predefined telephone number at said originating screening office upon subsequently receiving said predefined telephone number dialed by calling telephone stations and establishing a connection between said calling telephone stations and said called telephone station in accordance with said translated destination telephone number and forwarding calling telephone station information thereto.

13. The method of operating the high capacity information forwarding system set forth in claim 12 wherein said step of periodically accessing said telephone network centralized data base comprises the step of formulating a query data message upon first receiving said predefined telephone number wherein said formulated query data message includes said predefined telephone number and transmitting said query data message to said telephone network centralized data base.

14. The method of operating the high capacity information forwarding system set forth in claim 13 wherein said step of storing said predefined telephone and destination telephone numbers comprises the step of receiving a reply data message from said telephone network centralized data base wherein said reply data message includes said predefined and translated destination telephone numbers with a determined information forwarding service capability of said called telephone station.

15. The method of operating the high capacity information forwarding system set forth in claim 13 wherein said operating method further comprises the step of periodically removing said predefined and translated destination telephone numbers from said originating screening office storage.

16. A method of operating a high capacity information forwarding system in an originating screening office of a telephone network wherein said method comprises the steps of storing both a predefined telephone number and a translated destination telephone number associated with said predefined telephone number and identifying a called telephone station of a customer having information forwarding service capability in storage means of said originating screening offices, searching said storage means when said originating screening office receives said predefined telephone number dialed from a calling telephone station, formulating a query data message including said dialed predefined telephone number and transmitting said query data message to a telephone network centralized data base upon failure to locate said dialed predefined telephone number in said storage means of said originating screening office, translating said predefined telephone number at said telephone network centralized data base into said destination telephone number, determining an information forwarding service capability of said called telephone station identified by said translated destination telephone number, formulating a reply data message including said predefined and translated destination telephone numbers with said determined information forwarding service capability of said called telephone station and transmitting said reply data message to said originating screening office having received said dialed predefined telephone number, identifying said information forwarding service capability of said called telephone station upon receipt of said reply data message and storing said predefined telephone and translated destination telephone numbers in said originating screening office storage means, searching said storage means upon each subsequent receipt of said dialed predefined telephone number at said originating screening office and upon locating said stored predefined telephone number establishing a connection with said called telephone station identified by said translated destination telephone number and forwarding information associated with said calling telephone station thereto, and periodically removing said predefined telephone and translated destination telephone numbers from said storage means of said originating screening office.

* * * * *